W. E. WOODARD.
BEARING FOR EXTENDED PISTON RODS.
APPLICATION FILED MAR. 1, 1918.
1,288,355.
Patented Dec. 17, 1918.
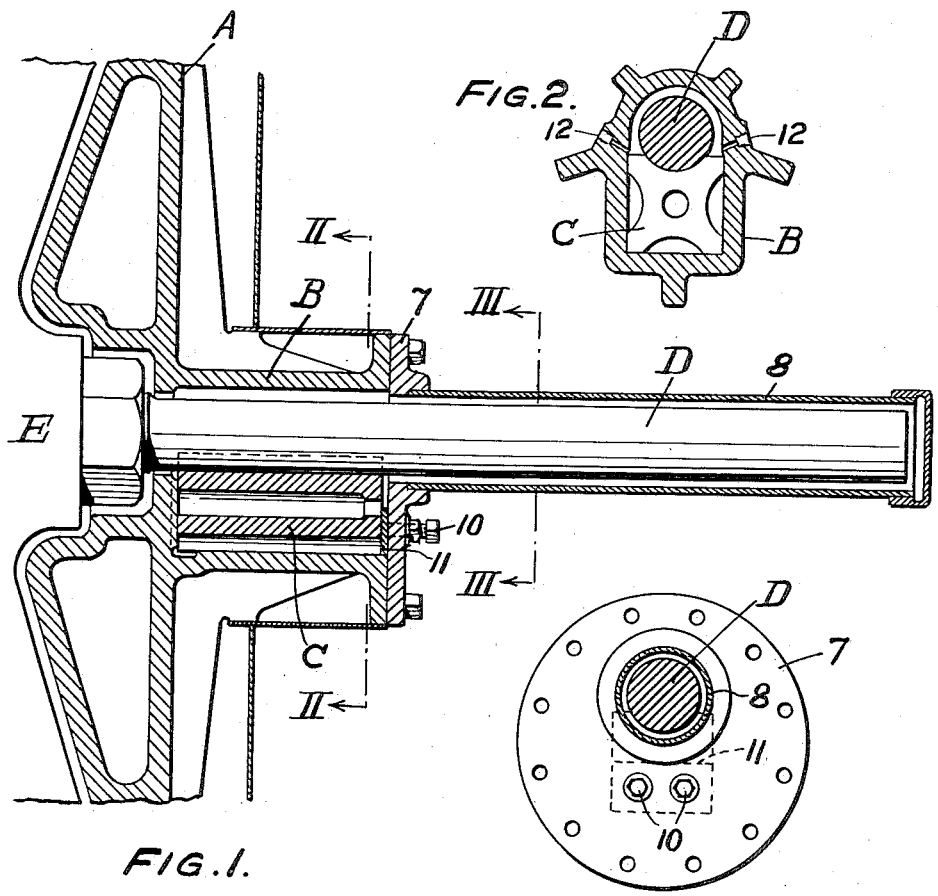
FIG. 1.
FIG. 2.
FIG. 3.
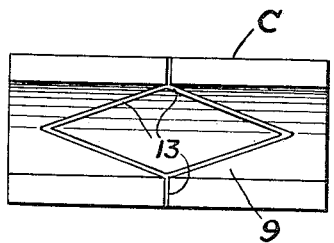
FIG. 4.
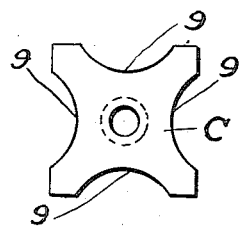
FIG. 5.
WITNESS:
Rob't R Litchel.
INVENTOR
William E. Woodard
BY
Symmes Pratt Bradley Redmond Fowkes
ATTORNEYS.

UNITED STATES PATENT OFFICE.

WILLIAM E. WOODARD, OF LIMA, OHIO.

BEARING FOR EXTENDED PISTON-RODS.

1,288,355.  Specification of Letters Patent.  Patented Dec. 17, 1918.

Application filed March 1, 1918. Serial No. 219,775.

*To all whom it may concern:*

Be it known that I, WILLIAM E. WOODARD, a citizen of the United States, residing at Lima, in the county of Allen and State of Ohio, have invented certain new and useful Improvements in Bearings for Extended Piston-Rods, of which the following is a specification.

This invention relates to an improvement in bearings for extended piston rods such as used for example in locomotives, and it has for one of its primary objects the provision of a simple and effective form of bearing by means of which the piston rod, when the parts are worn, can be returned to its exact and central location in the cylinder barrel. My invention also contemplates the provision of an improved bearing having a plurality of wearing faces adapted to be successively brought into position, as the surfaces wear. In general, my invention is designed to provide a bearing having the characteristics set forth which is readily accessible.

The foregoing, together with such other objects as may hereinafter appear, I obtained by means of a construction which I have illustrated in preferred form in the accompanying drawings, wherein:

Figure 1 is a partial section through the front head of a locomotive cylinder and piston, showing the piston rod extension in side elevation, the construction of that portion of the head receiving the bearing, and the relation of the bearing to the other parts; Fig. 2 is a section taken on the line II—II of Fig. 1; Fig. 3 is a section taken on the line III—III of Fig. 1; Fig. 4 is a plan view of the bearing shoe or block; and Fig. 5 is an end elevation of Fig. 4.

The piston of a locomotive or other engine bears on the barrel of the cylinder, and the purpose of a piston rod extension is to provide a means for supporting the piston rod and piston to relieve the pressure and consequent wear between the piston and cylinder barrel. Such piston rod extension bearings have been of two general types, in one of which a stuffing box is provided in the front cylinder head, and the piston rod extension is passed through such stuffing box and the extension supported by a shoe which rests upon some guiding surface. The shoe which supports the end of the piston rod extension and the supporting guide are outside of the cylinder, and therefore, accessible, but such general arrangement is open to the objection that an expensive steam-tight stuffing box, which must be maintained, is required, and to the further objection that the sliding shoe, or other form of supporting means, must be placed at the extreme end of the extension, which is the extreme distance from the piston which is the body to be supported. By this arrangement, an extension of large diameter, in order to provide the requisite strength to support the weight of the piston, is necessary, and in addition, the stuffing box is always liable to leak and cause steam blows around the front of a locomotive.

The other general form of piston rod extension bearing is of the inclosed type in which the piston rod extension is inclosed within a steam-tight casing and the bearing which supports the extension is within this inclosed space. The chief objection to be noted in connection with the inclosed type of bearing has been that in the designs heretofore noted, difficulty has been experienced in lining up the supporting bearing to the proper height, or in other words, the difficulty in restoring the piston rod to its exact central location in the cylindrical barrel when the bearing becomes worn. In this type, difficulty of lubrication has also been encountered.

By my present invention, I employ a piston rod extension bearing of inclosed type which has distinct advantages over the stuffing box type in that the stuffing box is eliminated, the bearing is at the closest possible point to the piston to be supported, and an extension of smaller diameter can be used. By the arrangement to be now described, I overcome the difficulties hereinbefore noted with regard to extension bearings of the inclosed type.

In the outer face of the front cylinder head A, I provide a recessed portion or bearing block chamber B, the walls of which are so formed as to receive the bearing block C on which the extension rod D rides. The front end of the chamber B is closed by the cap 7 which is threaded to receive the steam-tight casing 8 adapted to inclose the extension rod. The piston is indicated at E.

Referring now to the bearing block C, it will be noted that it is formed with a plurality of bearing surfaces 9 for the extension rod, preferably 4 in number, machined exactly alike, and all surfaces being equidistant from the center of the block. The lower portion of the chamber B is shaped to correspond with the general outline of the bearing block, the dimensions being such that when the block is inserted, the extension rod D will be supported in exact central position. The block is securely held in place in the chamber B by means of set screws 10 which pass through the casing cap 7 and bear against the bearing block through the medium of a hardened steel plate 11 which distributes the pressure of the set screws and prevents them from embedding themselves into the bearing block which is composed of relatively soft material, such as bronze or brass. This provides a simple arrangement for clamping the block in position and preventing the working back and forth with the motion of the extension, and at the same time, for taking up wear should any wear take place.

When one of the surfaces of the bearing block becomes worn, it is only necessary to remove the casing cap 7 from off the cylinder head, take the weight of the piston rod from off the bearing block, remove the bearing block and rotate it so as to bring a new bearing surface to present to the extension. By this means the piston rod extension is automatically restored to the exact location which it first occupied, before any wearing of the bearing block took place and the operation can be repeated as many times as there are unused bearing surfaces on the block. The value of this feature of the invention will be readily understood by those familiar with the art, because of the known difficulty in arriving at definite measurements by means of which an adjustable form of bearing could be adjusted to take up the wear.

Lubricant may be supplied by an oil line from the engine lubricator, such line being carried to a point above the device and there branched with one portion leading to each of the openings 12 located in the upper portion of the chamber B in such manner as to direct the incoming oil to the upper face of the bearing block C. In order that the oil may be distributed throughout the length of the bearing block, each bearing surface 9 is grooved as indicated at 13 in Fig. 4.

While I prefer the exact embodiment shown, it will be readily understood that a bearing embodying my invention as set forth in the appended claims may be used with other forms of piston rod extensions.

I claim:

1. The combination with a piston rod extension, of a bearing having a plurality of bearing surfaces adapted to receive and support such extension and so disposed that when an unused bearing surface is presented to the extension, said extension is returned to its original central position.

2. The combination with a piston having a piston rod extension, and a cylinder head provided with a chamber through which the extension is carried, of a removable bearing block mounted in said chamber and provided with a plurality of bearing surfaces adapted to receive and support said extension.

3. The combination with a piston having a piston rod extension, and a cylinder head provided with a chamber through which the extension is carried, of a removable bearing block mounted in said chamber and adapted to support said extension in central position, said bearing block being provided with a plurality of similar bearing surfaces so arranged that when an unused bearing surface is presented, the said extension is returned to original central position.

4. The combination with a piston having a piston rod extension, and a cylinder head provided with a chamber through which said extension is carried, of a removable bearing block mounted in said chamber and provided with a plurality of bearing surfaces adapted to receive and support said extension in central position, each of said bearing surfaces being provided with an oil groove, and means for introducing a lubricant into the recessed portion.

5. The combination with a piston having a piston rod extension, and a cylinder head having a recessed portion through which the extension is carried, of a bearing block mounted in said recessed portion provided with a plurality of bearing surfaces so disposed that when an unused bearing surface is presented to the extension, the extension is returned to original central position, each bearing surface of the said bearing block being provided with an oil groove, and means for introducing a lubricant into said recessed portion.

6. The combination with a piston having a piston rod extension, and a cylinder head provided with a chamber through which said extension is carried, of a removable bearing block fixedly mounted in said chamber and adapted to support said extension, and clamping means for positioning the block in said chamber against movement therein.

In testimony whereof I have hereunto signed my name.

WILLIAM E. WOODARD.